Figure 1:
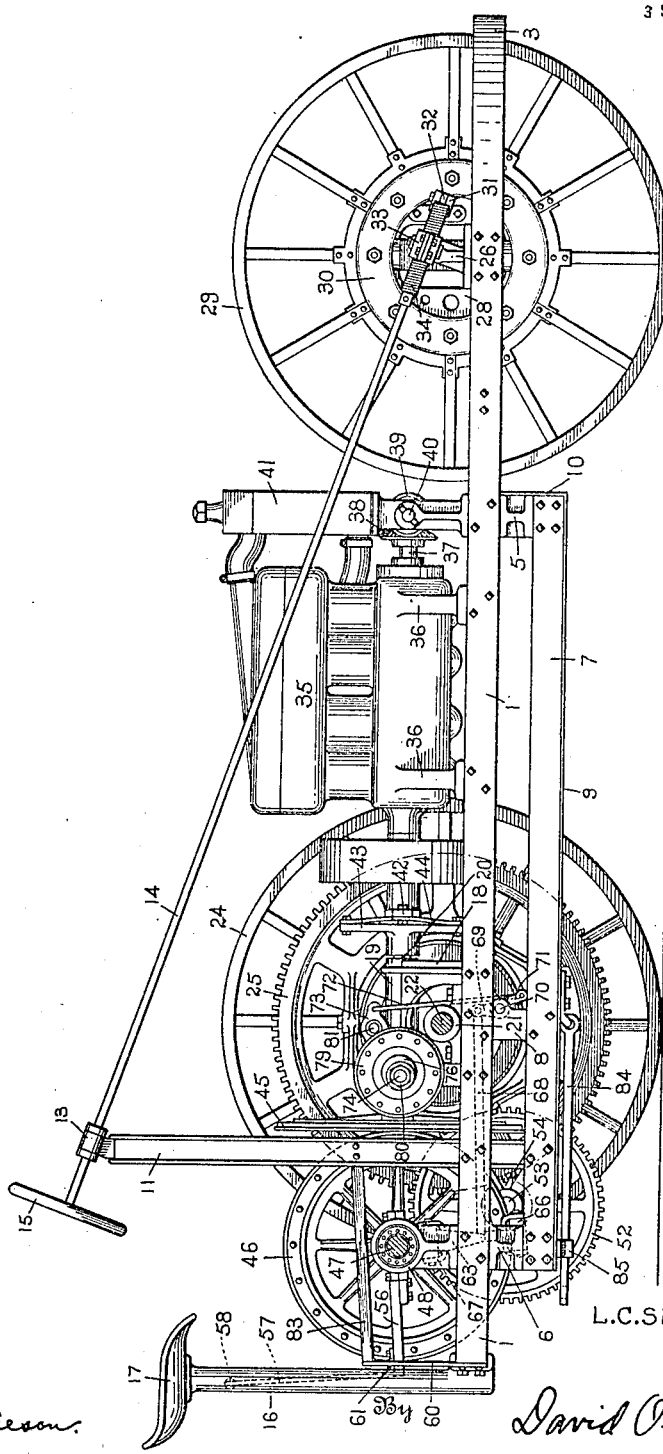

L. C. SHARP.
TRACTOR.
APPLICATION FILED JULY 27, 1916.

1,280,880.

Patented Oct. 8, 1918.
3 SHEETS—SHEET 1.

Witness:
A. W. Jamieson

Inventor
L. C. Sharp,
By David O. Barnell.
Attorney.

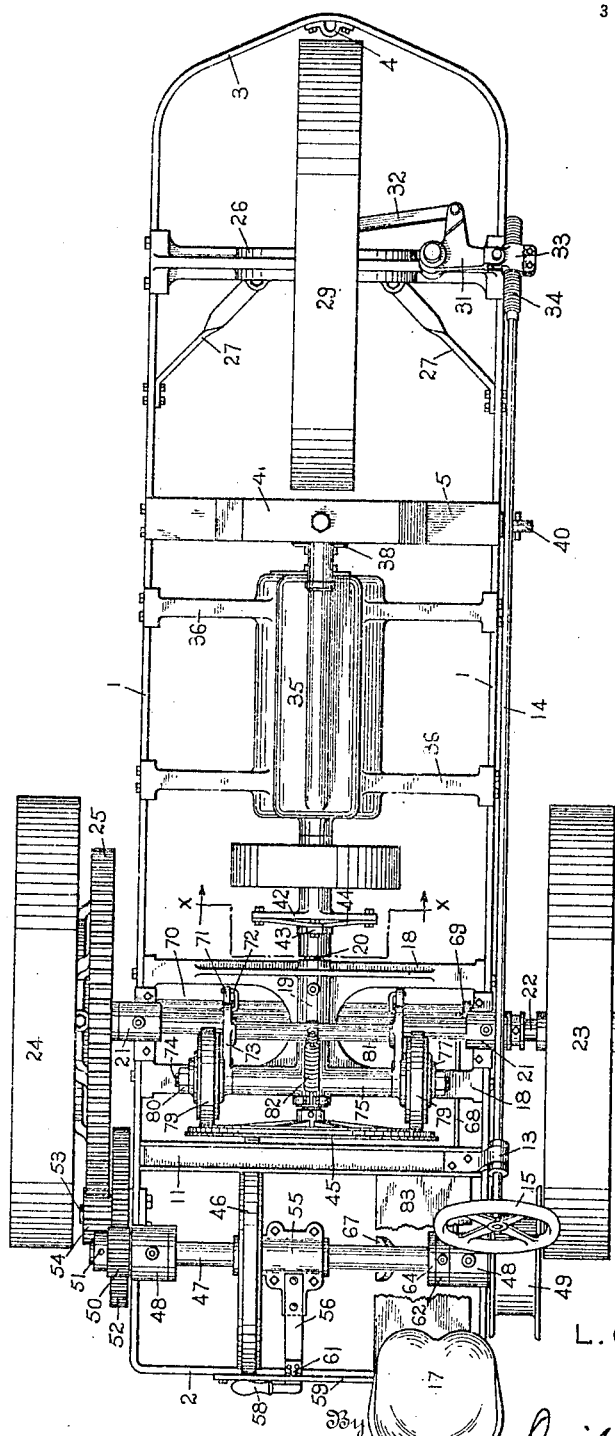

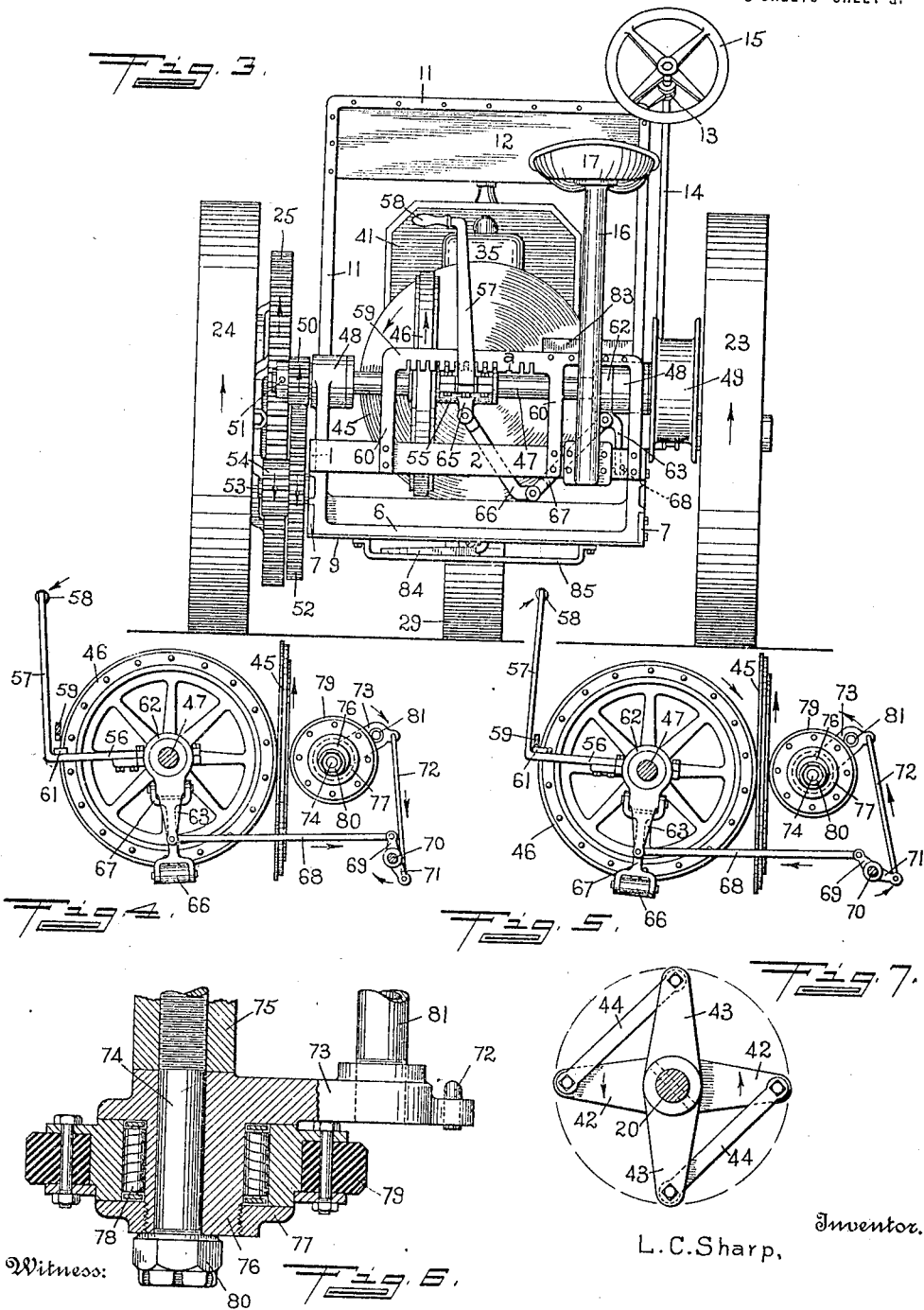

UNITED STATES PATENT OFFICE.

LEE C. SHARP, OF PLATTSMOUTH, NEBRASKA.

TRACTOR.

1,280,880.  Specification of Letters Patent.  Patented Oct. 8, 1918.

Application filed July 27, 1916. Serial No. 111,639.

*To all whom it may concern:*

Be it known that I, LEE C. SHARP, a citizen of the United States, and a resident of Plattsmouth, in the county of Cass and State of Nebraska, have invented certain new and useful Improvements in Tractors, of which the following is a specification.

My invention relates to the general class of self-propelled vehicles, and particularly to machines of this class driven by internal combustion engines and adapted for pulling other vehicles, such as agricultural machines, and for furnishing power for the operation of machinery at fixed locations. It is the object of my invention to provide a simple, inexpensive and efficient machine of this class; to provide therefor a light and rigid framework, relatively high driving and steering wheels adapting the same for passage over rough ground, an arrangement of the frame and wheels such as to secure a low center of gravity and insure stability when turning corners and on sloping ground, and simple easily-controlled power-transmitting devices between the engine and the driven parts. A further object of my invention is to provide a frictional variable-speed power-transmission mechanism having a single control-lever for setting the same for various speeds and also for engaging and disengaging the friction-wheel and friction-plate. A further object of my invention is to provide in such a power-transmission mechanism means for directly engaging and receiving the thrust of the friction-plate near the peripheral part thereof and for moving the same into engagement with the friction-wheel. Further and more particular objects of my invention will appear hereinafter.

In the accompanying drawings Figure 1 is a side view of a machine embodying my invention, the adjacent driving-wheel being removed, Fig. 2 is a plan view of the machine, Fig. 3 is a rear elevation of the same, Fig. 4 is a detail side view of parts of the power-transmission mechanism and controlling devices therefor, Fig. 5 is a similar view showing the parts in different positions, Fig. 6 is a detail horizontal axial section through one of the pressure-wheels for receiving the thrust of the friction-plate at the peripheral part thereof, and Fig. 7 is a detail transverse vertical section of the transmission-shaft on the plane of the line *x—x* of Fig. 2.

In the illustrated embodiment of my invention, there is a main frame of which the principal member is a continuous metal bar of rectangular cross-section, comprising parallel side-portions 1 connected at their rear ends by a transverse portion 2, and having at their front ends a V-shaped integral connecting portion 3, as shown in Fig. 2. On the inner side of said portion 3, at the center thereof, there is secured a U-strap 4 forming an eye for convenience in coupling the frame to that of another machine or vehicle in front of the same. Between the intermediate portions of the side-members 1 there is a cross-beam 5, and a like cross-beam 6 is arranged between said side-members near the rearward ends thereof, the ends of said cross-beams 5 and 6 being rigidly secured to the members 1, and extending below the same as shown in Figs. 1 and 3. To the lower end-portions of said cross-beams 5 and 6 there are secured the ends of the lower side-bars 7 which extend parallel with and in spaced relation to the members 1, being connected therewith at intermediate points by vertical strut-plates 8. To the lower edges of the side-bars 7 there are secured the edges of a large bottom-plate 9 which extends horizontally between them, forming a transverse bracing-member and a pan beneath the engine and transmission mechanism. At the front end of the plate 9 a portion 10 is extended up to the level of the lower edges of the members 1. Between the strut-plates 8 and the rear cross-beam 6 there is secured to the side-bars 1 and 7 the lower ends of a vertically disposed arch-beam 11 which carries on its upper portion the dash-plate 12. To the upper part of the arch-beam 11 at one side there is secured a bearing 13 for the rearward portion of an inclined shaft 14 which carries the steering hand-wheel 15 at the end thereof, as shown. Near the same side of the machine there is secured to the rear transverse frame-bar 2 a vertical post 16 which carries at its upper end the driver's seat 17. At points alined transversely with the strut-plates 8 there are secured to the side-bars 1 the ends of an arched bridge-member 18, in the upper central portion of which there is formed a bearing 19 for the transmission-shaft 20. To the ends of said bridge-member, above the side-bars 1, there are secured bearings 21 in which the rear axle 22 fits revolubly, the central part of said axle passing beneath the bearing 19. The drive-wheel 23 is fixedly secured to said axle 22, and the other drive-wheel 24 is mounted revolubly on the opposite end of the axle. The wheel 24 and the axle 22 are both connected, by a suitable differential-gear device, with the large bull-gear 25 which is positioned concentrically with the axle between the wheel 24 and the adjacent side of the frame, as shown. The ends of the front axle 26 are fixedly connected with the front portions of the side-bars 1, being further attached thereto by the brace-bars 27 shown in Fig. 2. At the central portion of the axle 26 an annular hub-member 28 is disposed around the same and pivotally connected therewith so as to be swingable about a vertical axis. The front wheel or steering-wheel 29 of the vehicle is mounted revolubly on said hub-member 28, there being interposed between said wheel and annular hub-member a roller-bearing device 30 adapted to maintain them in concentric and laterally-fixed relation to each other. At one side of the wheel 29 there is pivotally mounted on the axle 26 a bell-crank 31 having a forwardly-extending arm which is connected by a rod 32 with the annular hub-member 28. To the laterally-extending arm of the bell-crank there is pivotally connected a block 33 having a threaded opening through it, and into said threaded opening there is screwed the threaded front end-portion 34 of the steering-shaft 14. By rotation of the hand-wheel 15 and shaft 14 the block 33 is moved longitudinally of said shaft, thus turning the bell-crank about its pivotal axis on the axle 26 and moving the connecting-rod 32 laterally, which swings the hub-member 28 about its vertical pivotal axis and turns the wheel 29 to any desired angular relation to the frame. The steering mechanism is more fully described, and is claimed, in my companion application for patent thereon, filed July 27, 1916, Serial No. 111,640. It may be here noted, however, that the steering-wheel 29 and driving-wheels 23 and 24 are of the same diameter and all relatively large, thus adapting the machine for easy movement over rough and irregular surfaces; that the forward thrust of the driving-wheels is transmitted in a direct horizontal line to the center or axis of the steering-wheel; and that, in the described construction, there is not the tendency to cause torsional stresses in the frame such as are occasioned by the use of a small steering-wheel mounted in a fork or caster and swingable about an axis inclined to the frame.

The crank-case of the engine 35 is provided with laterally-extending arms 36 which rest upon and are secured to the side-bars 1 of the frame, the axis of the engine crank-shaft 37 extending horizontally slightly above the planes of the axes of the driving and steering wheels, and in longitudinal alinement with the transmission-shaft 20. On the front end of the crank-shaft is a bevel gear 38 which meshes with a like gear 39 carried on a transverse shaft 40 journaled in an upward extension of the cross-beam 5. The end of the shaft 40 is adapted for engagement with a suitable crank for use in starting the engine. The radiator 41 is mounted on the cross-beam 5, and suitably connected with the water-jackets of the engine-cylinders. On the rearward end of the crank-shaft 37 there is secured a coupling-member comprising two oppositely-extending radial arms 42, and on the front end of the transmission-shaft 20 there is a like coupling-member having arms 43 which extend at right angles to the arms 42. The outer ends of the arms 42 and 43 are connected to each other by resilient tension-bars 44, as shown in Fig. 7, the connection being such that by a slight bending of said bars 44 a certain longitudinal movement of the transmission-shaft is permitted. On the rearward end of the transmission-shaft is carried the friction-plate 45, of which the rearward surface is engageable by the periphery of the friction-wheel 46. The latter is secured on a cross-shaft 47 by means of a long key or spline, so as to be slidable longitudinally thereof. The cross-shaft 47 is journaled in bearings 48 formed in upwardly-extended end-portions of the cross-beam 6. On one end of the shaft 47, outside the bearing, there is secured a flanged pulley 49, and on the other end of the shaft a pinion 50 is secured by means of a pin 51. Said pinion 50 meshes with a gear 52 which is mounted revolubly on a stub-shaft 53 carried on the adjacent portion of the frame. A pinion 54 is secured to the outer side of said gear 52, and meshes with the bull-gear 25, from which power is transmitted through the differential-gear device to the driving-wheels.

The friction-wheel 46 has a long annularly-channeled hub which passes revolubly through a box 55, the latter fitting in the annular channel of said hub and being fixedly connected with a shifting-lever comprising a portion 56 extending rearwardly from the box, a portion 57 extending upwardly from the end of the horizontal portion, and a handle 58 extending laterally from the upper end of the vertical portion, adjacent to the driver's seat 17. The horizontal part 56 of the shifting-lever passes beneath the notched lower edge of a horizontal bar 59 which has integral vertical portions 60 extending down and secured to the rear frame-member 2. A tongue-piece 61 is secured to the lever and is adapted to enter the notches of the bar 59 to retain the lever in fixed transverse relations to the frame, and said tongue 61 may be inserted in and withdrawn from the notches by moving the lever pivotally about the axis of the cross-shaft 47. Movement of the friction-wheel 46 laterally along the shaft 47 is effected by disengaging the lever from the notched bar and then merely pushing or pulling the lever in the direction that is desired to move the wheel. The pivotal movements of the shifting-lever, necessary to insert the tongue 61 and withdraw the same from the notches in the bar 59, are employed to automatically move the friction-plate 45 into and out of operative engagement with the wheel 46, so that said plate and wheel cannot be operatively engaged during the lateral shifting of the wheel to vary the speed-ratio of the transmission mechanism. The connecting mechanism between the shifting-lever and the friction-plate is constructed as follows:

Adjoining the inner end of one of the bearings 48, the hub 62 of an arm 63 is mounted pivotally on the shaft 47, the arm extending downwardly from the shaft and a collar 64 being secured to the shaft adjoining the inner end of said hub 62, to prevent movement of the arm laterally along the shaft. On the lower part of the box 55 are lugs 65 between which the head of a toggle-bar 66 is held by means of a suitable pivot-pin. A head at the opposite end of said toggle-bar 66 is connected with the forked lower end of a second toggle-bar 67, and the forked upper end of the latter toggle-bar is pivotally connected with the arm 63, as shown in Fig. 3. Said toggle-bars form a foldable, torsionally-rigid connecting means between the box 55 and arm 63, and communicate to said arm any pivotal movements of the box and shifting-lever about the axis of the shaft, but permit free movement of the shifting-lever, box 55 and friction-wheel along the shaft 47. From the lower end of the arm 63 a connecting-rod 68 extends forwardly to an arm 69 on a small cross-shaft 70 of which the ends are journaled in the strut-plates 8. Arms 71 on said shaft 70 are connected by rods 72 with the ends of crank-arms 73 mounted pivotally on horizontal studs 74 which are carried by lugs or bosses 75 extending out laterally from the rearward part of the bearing 19 of the transmission-shaft. The crank-arms 73 are integral with eccentrics 76 of which the outer ends are threaded to receive a flange-collar 77, as shown in Fig. 6. On the eccentrics are disposed roller-bearings 78 which support revolubly the pressure-wheels 79. The eccentrics are retained on the studs 74 by means of nuts 80 screwed on the ends of the studs, as shown. The arms 73 are connected to each other by a cross-rod 81, and to the central part of said rod is connected one end of a coil spring 82, the other end of said spring being connected with a collar on the rear end of the bearing 19, as shown in Fig. 2. Said spring 82 pulls the arms 73 upwardly and rearwardly, tending to rotate the eccentrics about the studs 74 so as to press the wheels 79 against the front side of the friction-plate at points near the outer edge thereof and alined horizontally with the axis of the transmission-shaft 20. This movement of the arms 73 is indicated in Fig. 5, and causes the rods 72 and arms 71 to be moved upwardly, the arms 69 and 63 and rod 68 moving rearwardly, and said movement of the arm 63 being communicated to the shifting-lever and tending to raise the same up into engagement with the notched bar 59. When the shifting-lever is pushed downwardly, as indicated in Fig. 4, the respective parts move in the opposite directions, and the eccentrics 76 are turned so as to withdraw the pressure-wheels from the friction-plate. The pressure of the wheels 79 upon the friction-plate moves the same axially far enough to cause a proper operative engagement between the rearward surface of the plate and the periphery of the friction-wheel 46, and, when the pressure of the wheels 79 is removed, the plate and transmission-shaft are pulled forward slightly by the resilient bars 44 of the coupling device between the transmission-shaft and crank-shaft of the engine, so that the friction-plate and wheel are disengaged.

It will be noted that the working pressure between the friction-plate and wheel is caused by, and is thus proportional to, the tension of the spring 82, so that by suitably proportioning the spring said pressure may be uniformly such as to give the greatest efficiency of operation. The location of the pressure-wheels 79 is such that they receive the entire thrust of the wheel 46 against the friction-plate, thereby preventing any tendency thereof to cause binding and excessive friction in the transmission-shaft bearing, or to so move the friction-plate that its surface will not be parallel with the axis of the cross-shaft 47.

In the illustrated structure, forward movement of the vehicle is caused when the friction-wheel is set to the left of the center of the friction-plate, and reverse or backward movement of the vehicle is caused by setting the friction-wheel to the right of the center of the friction-plate. At the central or neutral position of the shifting-lever, the tongue 61 is engageable in a shallow notch $a$ in the bar 59 to retain the lever in said position, but the depth of the notch $a$ is not such that the lever can be raised far enough to cause or permit engagement of the friction-plate and wheel. As it is never desirable to drive the machine at full speed backwardly, a part of the space into which the wheel 46 might be moved to the right of the central position, is utilized for a foot-board 83 which is disposed at a suitable distance below the seat 17, the rear end of the board being supported on the bar 59 and the front end on a bracket attached to the arch-beam 11.

A draw-bar 84 is pivotally connected with the central part of the bottom-plate 9, and the rearward part of said draw-bar rests slidably upon a guide-plate 85 arranged below the cross-beam 6, as shown.

I contemplate the use, in some cases, of two or more of the described tractors arranged in tandem, the draw-bar 84 of the front machine being suitably coupled, as by a chain, with the eye formed by the U-strap 4 at the front end of the rear machine. When so used, the flexibility of speed-variation of the transmission mechanism will enable the two machines to be driven in unison.

For using the machine as a power-plant in the operation of stationarily positioned machinery, the pin 51 is removed and the pinion 50 taken off the cross-shaft 47, after which the pulley 49 is connected by belt with the machine that is desired to be driven. When so used, the cross-shaft 47 and pulley 49 may be driven at any desired speed by suitable adjustment of the frictional transmission devices. The pulley 49 may also be employed as a rope-drum for use in hoisting operations and the like.

Now, having described my invention, what I claim and desire to secure by Letters Patent is:

1. In a machine of the class described, speed-changing transmission mechanism having a driving shaft, a friction-plate carried on one end of said shaft, and a friction-wheel engageable by said friction-plate, pressure-wheels engaging said friction-plate at points axially opposite those engageable with the friction-wheel, eccentrics on which said pressure-wheels are revolubly mounted, and means for turning said eccentrics to move the pressure-wheels and press the friction-plate axially toward the friction-wheel.

2. In a machine of the class described, the combination with a friction-drive speed-changing transmission mechanism having a driving shaft and a driven shaft extending at right angles to each other, a friction-plate carried on one end of the driving shaft, and a friction-wheel mounted slidably on the driven shaft and engageable with the friction-plate, of eccentrics mounted on axes parallel with the driven shaft adjacent to the periphery of the friction-plate, pressure-wheels mounted revolubly on said eccentrics, means for turning the eccentrics to move the pressure-wheels and friction-plate toward the driven shaft to operatively engage said plate with the peripheral portion of the friction-wheel, and means for moving the driving shaft longitudinally to disengage the friction-plate from the friction-wheel.

3. In a machine of the class described, the combination with a friction-drive speed-changing transmission mechanism having a rotatable and axially-movable friction-plate, a shaft parallel with the plane of rotation of said friction-plate, and a friction-wheel mounted slidably on said shaft and having the peripheral part thereof adjacent to the friction-plate, of a lever connected with said friction-wheel and movable to shift said wheel longitudinally of said shaft, means connected with said lever and controlled thereby for moving the friction-plate axially to engage the same with the friction-wheel, and retaining means for preventing movement of the lever to shift the friction-wheel, said retaining means being engageable by the lever simultaneously with the movement thereof by which the friction-plate is engaged with the friction-wheel.

4. In a machine of the class described, the combination with friction-drive speed-changing transmission mechanism having a revoluble and axially-movable friction-plate, a friction-wheel engageable peripherally by said friction-plate, and a shaft on which said friction-wheel is mounted slidably so as to be movable radially of the friction-plate, of shifting means for sliding said friction-wheel along said shaft, said shifting means being movable with the wheel longitudinally of the shaft and also movable pivotally about the axis of the shaft, means for moving the friction-plate axially to engage and disengage the friction-wheel, a pivoted arm connected with and controlling said means for moving the friction-plate axially, and means extensible longitudinally of the friction-wheel shaft and connecting said arm and the shifting means so that pivotal movements of the shifting means are communicated to the arm.

5. In a machine of the class described, the combination with a friction-drive speed-changing transmission mechanism having a revoluble and axially-movable friction-plate, a friction-wheel engageable by said plate, and a shaft on which said friction-wheel is slidable to vary the position thereof radially of the friction-plate, of a member with which said friction-wheel is revolubly connected so that said member is movable pivotally about the axis of the shaft and also movable longitudinally of the shaft to slide the wheel along the same, an arm pivotally mounted on the shaft and held in fixed longitudinal relation thereto, foldable torsionally-rigid means connecting said member and said arm, actuating means for moving the friction-plate axially to operatively connect and disconnect the same and the friction-wheel, and means connecting said actuating means and said pivoted arm.

6. In a machine of the class described, an engine-shaft, a transmission-shaft journaled in longitudinal alinement with the engine-shaft, a coupling device between said shafts tending to retain the transmission-shaft in fixed relation to the engine-shaft but yieldable to enable longitudinal movement of the transmission-shaft, a friction-plate carried by the transmission-shaft, a friction-wheel of which the periphery is engageable by the friction-plate, a transverse shaft on which the friction-wheel is slidably mounted, pressure-wheels engaging one side of the friction-plate near the outer edge thereof and alined horizontally with the transverse shaft and friction-wheel, yielding means tending to move said pressure-wheels horizontally to press the friction-plate into operative engagement with the friction-wheel, and manually-controlled inter-connected means for moving said pressure-wheels away from the friction-plate and for sliding the friction-wheel along the transverse-shaft.

LEE C. SHARP.

Copies of this patent may be obtained for five cents each, by addressing the "Commissioner of Patents, Washington, D. C."